United States Patent
Rao (10) Patent No.: US 8,095,634 B2
(45) Date of Patent: Jan. 10, 2012

(54) DEVICE MANAGEMENT SYSTEM FOR MOBILE DEVICES THAT SUPPORTS MULTIPLE-POINT TRANSPORT

(75) Inventor: Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 287 days.

(21) Appl. No.: 11/839,143

(22) Filed: Aug. 15, 2007

(65) Prior Publication Data

US 2008/0046583 A1 Feb. 21, 2008

Related U.S. Application Data

(60) Provisional application No. 60/838,028, filed on Aug. 15, 2006.

(51) Int. Cl.
*G06F 15/173* (2006.01)
(52) U.S. Cl. ...................................................... 709/223
(58) Field of Classification Search .................. 709/220, 709/223, 227, 230
See application file for complete search history.

(56) References Cited

U.S. PATENT DOCUMENTS

| | | | |
|---|---|---|---|
| 6,832,373 B2 * | 12/2004 | O'Neill | 717/171 |
| 6,885,862 B1 * | 4/2005 | Pearson | 455/419 |
| 7,310,720 B2 * | 12/2007 | Cornett | 711/170 |
| 2002/0075824 A1 | 6/2002 | Willekes | |
| 2005/0272455 A1 * | 12/2005 | Oommen | 455/518 |
| 2006/0236325 A1 * | 10/2006 | Rao et al. | 719/315 |
| 2006/0277590 A1 * | 12/2006 | Limont et al. | 726/1 |
| 2007/0133484 A1 * | 6/2007 | Albal et al. | 370/338 |
| 2007/0190939 A1 * | 8/2007 | Abel | 455/41.2 |
| 2007/0192453 A1 * | 8/2007 | Copeland et al. | 709/223 |
| 2009/0190757 A1 * | 7/2009 | Chen et al. | 380/242 |

FOREIGN PATENT DOCUMENTS

| | | |
|---|---|---|
| EP | 1049346 A | 11/2000 |
| WO | 20050041459 | 5/2005 |

OTHER PUBLICATIONS

"International Search Report/Written Opinion" for PCT Application PCT/US2007/076001, dated Jan. 31, 2008.
Hoffmeyer J. et al., "Radio Software Download for Commercial Wireless Reconfigurable Devices", IEEE Communications Magazine, IEEE Service Center, New York, NY, US, vol. 42, No. 3, Mar. 2004, pp. S26-S32; XP001195210; ISSN: 0163-6804; p. 27, paragraph "Software and Hardware in Wireless Devices"; p. 28, paragraph "Radio Software Download Requirements"; and, p. 31, paragraph "Standards Entities Involved din Software Download", figures 1,2.

* cited by examiner

*Primary Examiner* — Jason Recek (57) ABSTRACT

A device management server uses both point-to-point and broadcast transport protocols to remotely manage a plurality of electronic devices. The server uses extensions to a standard device management protocol to access, via the point-to-point transport protocol, device management information in memory of the electronic device. The device management information permits the electronic device to receive information using the broadcast transport protocol. Results from processing the received information are returned to the server using the point-to-point transport protocol. The device management server also employs handset control and enterprise control management objects to conduct device wipe, lock, unlock and other operations.

19 Claims, 7 Drawing Sheets

DEVICE MANAGEMENT SYSTEM FOR MOBILE DEVICES THAT SUPPORTS MULTIPLE-POINT TRANSPORT

The present application makes reference to, claims priority to, and claims benefit of U.S. Provisional Application Ser. No. 60/838,028 entitled "DEVICE MANAGEMENT SYSTEM FOR MOBILE DEVICES THAT SUPPORTS MULTIPLE-POINT TRANSPORT", filed Aug. 15, 2006, the complete subject matter of which is hereby incorporated herein by reference, in its entirety.

In addition, the present application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information", filed Nov. 19, 2001, and having publication date Mar. 23, 2002, the complete subject matter of each of which is hereby incorporated herein by reference, in its entirety.

BACKGROUND OF THE INVENTION

Non-volatile memory is employed in a wide variety of electronic devices such as, for example, mobile handsets, cellular phones, personal digital assistants (PDA's), pagers and handheld personal computers. The non-volatile memory in these devices contains firmware, application software, data, and configuration information that makes the devices operational, and may be provided by the manufacturers of the electronic devices, by system operators of telecommunication carrier networks, or by third parties developers. If defects are found in such firmware/software, or if new features are to be added to such devices, the software and/or firmware in the affected electronic devices may need to be updated. Errors and/or interruptions that may occur during the updating of such operational code may leave the electronic device in a partly or completely non-functional state. To avoid this problem, present methods of updating such software and/or firmware involve returning the electronic device to the manufacturer, to the system operator, or to the third party, so that an update of memory contents may be performed using a direct connection to the electronic device. This is both costly and inconvenient to both the user of the electronic device, and to one performing the update.

Configuration parameters and other information for an electronic device may be stored in the non-volatile memory of such devices, and information about the device capabilities, the hardware, software and manufacturer of the device, and particulars for a given instance of the device in a network may be stored in databases used by, for example, device management and customer service operations. Such databases may be accessible to device management and customer service operations through database access mechanisms using, for example, structured query language (SQL) or similar database management tools.

Updates to firmware and/or software in an electronic device may be developed by a number of parties including, for example, the manufacturer of the electronic device, the provider of services of a communication network accessed by the electronic device, or a third party. While the manufacturer and/or third party may be technically qualified and capable of creating workable updates for the firmware and/or software in an electronic device, such updated firmware and/or software may not be planned for or compatible with the services and communication capabilities of the communication network of the service provider. Although the user of the electronic device may have authorization to use the network, an update to the firmware/software of the electronic device may not be authorized for use in electronic device served by the communication network of the service provider.

Different electronic devices have, for example, different resources available, different sets of operating parameters, and the like, that may be changed to support personalization of the electronic device. A user typically has no means to determine what resources and/or parameters are involved in a desired personalization, or how the user is to go about personalizing the phone. Determining which electronic devices are capable of or allow such personalization in a device can be a problem for both users and support staff of communication system/network operators.

Problems occur when the electronic device of a subscriber is not functioning properly. There are many problems that may arise including, for example, outdated software both at the firmware and application level, incorrect setting of various service parameters, and the like. Current support tools used by communication network/system operators are of little help in fixing such problems when they are reported.

Management of an electronic device is difficult to perform without the use of a device management solution such as an automated device management system. The Open Mobile Alliance (OMA)—Device Management (DM) specifications are based on point-to-point transport protocols, such as the hypertext transport protocol (HTTP) and OBject EXchange (OBEX) protocol. However, with 40 million or more devices/users in a large communication network, device management (DM) using point-to-point transport is very inefficient. It is also very demanding in terms of server-side support. Device management (DM) servers such as, for example, those servers supporting the OMA-DM protocol, may be involved in the establishment of millions of DM sessions with electronic devices. Each of the DM sessions is a drain on resources of the communication network.

A user is generally not capable of determining the impact of device management sessions on their electronic device, or on the supporting communication networks. The operators of those supporting communication conduct DM sessions for various reasons. Conducting individual device management sessions for each electronic device is a time consuming and resource intensive operation. It is desirable to minimize the impact of device management activities both on the communication network, and on the use of the electronic device by the user.

Further limitations and disadvantages of conventional and traditional approaches will become apparent to one of skill in the art, through comparison of such systems with a representative embodiment of the present invention as set forth in the remainder of the present application with reference to the drawings.

DETAILED DESCRIPTION OF THE INVENTION

Aspects of the present invention relate generally to the updating of memory in electronic devices, and more specifically, to methods and systems supporting device management of multiple electronic devices using communication networks that employ broadcast or multipoint communication protocols. Device management may comprise, for example, the processing and distribution of updates for firmware, software, configuration parameters and file systems in memory of an electronic device such as, for example, non-volatile FLASH-type memory. While the following discussion focuses primarily on mobile electronic devices such as, for example, a mobile handset, a cellular phone, a personal digital assistant, a pager, and a handheld personal computer, this is by way of example and not by way of specific limitations of the present invention. The teaching contained herein may also be applicable to a variety of other electronic devices having a processor and memory containing software, firmware, configuration information, data files, and the like, for which updating of memory contents may be desirable.

Representative embodiments of the present invention may be employed during updates using wired or wireless communication links such as, for example, a public switched telephone network, a wired local or wide area network, a wired wide area network, an intranet, the Internet, and wireless cellular, paging, local area, personal area, short range, broadcast, metropolitan access, and/or multipoint networks such as those wireless networks referred to as Wi-Fi networks, IEEE 802.11 a/b/g/n compatible networks, networks referred to as Imax networks, IEEE 802.16d/e networks, the short range wireless technology known as Bluetooth, and similar types of communication links.

In a representative embodiment of the present invention, information for updating memory in an electronic device such as those described above is communicated using, for example, an update package comprising a set of instructions executable by firmware and/or software in the electronic device to transform or convert an existing version of software, firmware, and/or data in the electronic device into a new or updated version of the software, firmware, and/or data. Such an update package may also contain metadata related to the update.

The following definitions, acronyms and abbreviations are use in this document:

| | |
|---|---|
| API | Application Programming Interface |
| CP | Client Provisioning |
| CSR | Customer Service Representative |
| DAO | Data Access Objects |
| DM | Device Management |
| DM Tree | Device management tree |
| GPRS | General Packet Radio Service |
| IMEI | International Mobile Equipment Identity |
| MMV | Refers to a combination of values that define a device make, model and (firmware) version |
| MO | Management Object |
| NVM | Non-Volatile Memory |
| OMA | Open Mobile Alliance |
| RAM | Random Access Memory |
| SMS | Short Message Service |
| SMSC | Short Message Service Center |
| UI | User Interface |
| URI | Universal Resource Identifier |
| URL | Universal Resource Locator |

Figure 1:
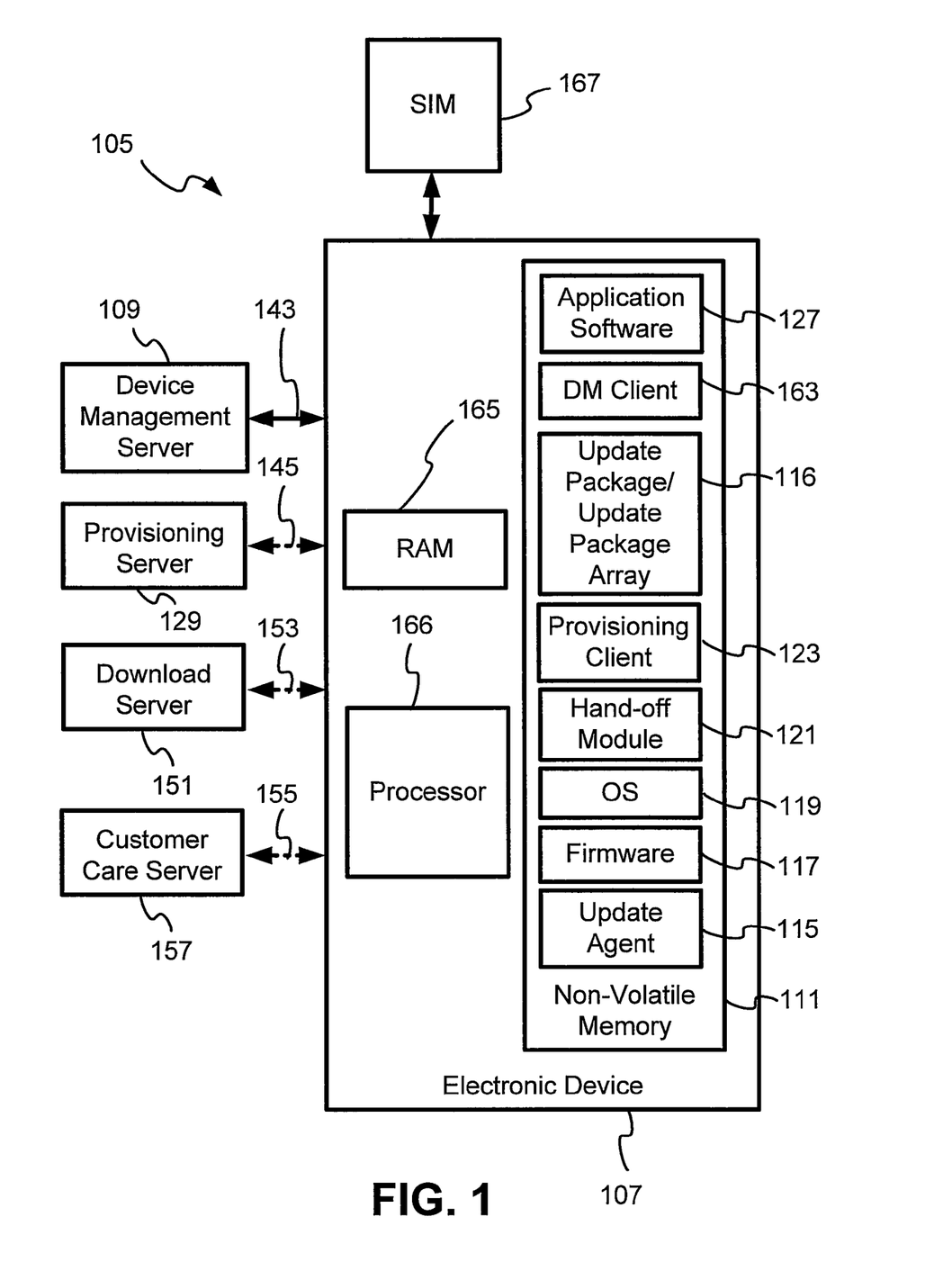
FIG. 1 is a perspective block diagram of an exemplary network that supports remote update of non-volatile memory of an electronic device such as, for example, a mobile handset or personal digital assistant, in accordance with a representative embodiment of the present invention.

FIG. 1 is a perspective block diagram of an exemplary network 105 that supports remote update of non-volatile memory of an electronic device 107 such as, for example, a mobile handset or personal digital assistant, in accordance with a representative embodiment of the present invention. The electronic device 107 may, for example, comprise a cellular phone, a personal digital assistant (PDA), a pager, a handheld personal computer (PC), and/or the like. The electronic device 107 may support a number of features and/or applications that may contain software/firmware errors that need to be corrected, or that may provide additional features/ benefits by updating the software/firmware. The electronic device 107 may itself be used to request updates to software/ firmware via a customer care server 157 either directly, using a browser in the electronic device 107, or via a customer service representative (CSR). A CSR may, for example, provide service to the customer using the electronic device 107 by retrieving, as necessary, one or more diagnostic management objects (MOs) stored in memory of the electronic device 107, and by transmitting to the electronic device 107 from a remote server, update information in the form of, for example, one or more update packages. Such update packages may, for example, comprise instructions to code in the electronic device 107 to convert or transform a first version of software/ firmware to a second version of software/firmware, in the electronic device 107, in addition to metadata, and checksum information.

As shown in the illustration of FIG. 1, the network 105 in one representative embodiment of the present invention comprises the electronic device 107, a device management (DM) server 109, a provisioning server 129, a customer care server 157, and a download server 151. Although not illustrated in FIG. 1, a representative embodiment of the present invention may also comprise other application servers such as, for example, a diagnostics server, and a self-care website/portal.

The electronic device 107 of FIG. 1 is able to communicate with the DM server 109, the download server 151, the customer care server 157, and the provisioning server 129 via communication paths 143, 153, 155 and 145, respectively. Although the communication paths 143, 153, 155, 145 are illustrated as being separate paths between the electronic device 107 and their respective servers, this is only for purpose of illustration, and is not a specific limitation of a representative embodiment of the present invention. The communication paths 143, 153, 155, 145 may be combined into one or more paths that may comprise any of the wired or wireless networks previously mention above, including point-to-point and/or broadcast, wired or wireless communication paths such as, for example, a local area network, a public switched telephone network, a wireless personal, local or wide area network, and a cellular or paging network, to name only a few possibilities. Although not shown in the illustration of FIG. 1, the electronic device 107 also comprises interfaces used to communicate over the communications paths 143, 153, 155, and 145, that have been omitted from the illustration solely to improve clarity to aid in understanding the figure.

As illustrated in FIG. 1, an electronic device in accordance with one representative embodiment of the present invention comprises a processor 166, random access memory (RAM) 165, and non-volatile memory (NVM) 111. The NVM 111 may comprise, for example, NAND or NOR type flash memory or other suitable type of NVM. The NVM 111 may contain a number of software/firmware code components of the electronic device 107 including, for example, application software 127, a device management (DM) client 163, an update package/update package array 116, a provisioning client 123, a hand-off module 121, an operating system (OS) 119, firmware 117, and one or more update agent(s) 115. Additional software/firmware code components may also be present in the RAM 165 and NVM 111. The term "code" may be used herein to represent one or more of executable instructions, operand data, configuration parameters, and other information stored in memory of the electronic device 107, and the term "update package catalog" may be used interchangeably with the term "update package array" to refer to received update information that comprises multiple update packages. The term "application software" or "software application" may be used herein to refer to code that provides functionality apparent to the user of the electronic device 107, as opposed to that code in the electronic device that supports application software such as, for example, an operating system, a file system, software support for communications protocols, and the like. Application software includes, for example, Internet web browsers, calendars and/or contact managers, and software for engaging in a particular user or enterprise task, to name just a few examples. The electronic device 107 may also comprise interface circuitry (not shown) to enable operable connection of a subscriber identity module (SIM) card 167, that may be employed in accordance with aspects of the present invention described later in this document.

In one representative embodiment of the present invention, an electronic device such as, for example, the electronic device 107 of FIG. 1 employs an update package (e.g., the update package/update package array 116) delivered by a remote server such as, for example, the download server 151, to update firmware/software, data and configuration information in memory of the electronic device 107. Such an update package comprises update information including, for example, metadata describing an update, checksums, and instructions executable by one or more update agents such as, for example, the update agent 115 of FIG. 1. The update agent 115 processes a set of executable instructions, which are used as a compact means to encode differences between existing/first and updated/second versions of firmware, software, data, and configuration parameters for the electronic device 107. The executable instructions may be assembled into update packages to be transmitted to an electronic device for use in updating memory of the electronic device. One or more update agent(s) in the electronic device process respective portions of the executable instructions from an update package to convert/transform corresponding portions of an existing/first version of code in memory of the electronic device 107 to portions of an updated/second version of code. The electronic device 107 may also receive provisioning information from, for example, the device management server 109, the customer care server 157, and/or the provisioning server 129 to fix configuration problems or reconfigure software and hardware.

In addition to those elements described above, the electronic device 107 may comprise a downloaded diagnostic client (not shown) that facilitates remote diagnosis, and a traps client (not shown) that facilitates the setting of traps and retrieving of collected information. The DM client 163 of the electronic device 107 may interact with the DM server 109, the diagnostic client, and the traps client, to receive DM commands from the DM server 109 and to implement them in the electronic device 107. The download server 151 may be employed to download firmware and software updates (e.g., update information in the form of, for example, update packages). The download server 151 may also be used to download new firmware/software such as, for example, the diagnostics client mentioned above, which may then be installed and activated in the electronic device 107.

As described briefly above, an electronic device in accordance with a representative embodiment of the present invention (e.g., electronic device 107) receives update information (e.g., an update package) for processing by one or more update agents (e.g., update agent 115) to convert/transform software (e.g., application software 127) and/or firmware (e.g., firmware 117) to produce updated software/firmware in the electronic device. In some representative embodiments of the present invention, the update agent 115 comprises multiple update agents, each of the update agents appropriately arranged to process different types of update information for updating different types/formats of software, firmware, user data, and configuration parameters in the memory of the electronic device 107. Each of the update packages received is processed in the electronic device by an appropriate one of the update agent(s) 115 to update an associated type of information in the memory of the electronic device 107.

In one representative embodiment of the present invention, an Open Mobile Alliance (OMA) device management (DM)-based applications server is composed of two parts, an OMA DM-based application, and an OMA DM server such as, for example, the DM server 109 shown in FIG. 1. An OMA DM-based application is mainly focused on business processes, logic, and data. An OMA DM server, however, is mainly focused on the functionality used to support the OMA DM protocol by which the OMA DM-based application manipulates OMA DM-capable electronic devices such as, for example, the electronic device 107 of FIG. 1.

An OMA DM common framework in accordance with a representative embodiment of the present invention is arranged to support a set of application programming interfaces (APIs) and call back services, so that OMA DM-based applications may be easily and effectively integrated with an OMA DM server, such as the DM server 109 of FIG. 1, for example. One example of an OMA DM-based application server is the Mobile Variance Platform (MVP) Server developed by Hewlett-Packard Company. An OMA DM-based common framework in accordance with a representative embodiment of the present invention supports a set of APIs and call back services that permit the integration of multiple applications including, for example, a customer care/service application, and other servers with an OMA DM-based server such as the DM server 109 of FIG. 1

A customer care server such as, for example, the customer care server 157 of FIG. 1, may provide an API for issuing OMA DM commands and values to OMA DM capable electronic devices, including the ability to explore the device management tree (DM tree) on the electronic device. Bootstrapping the electronic device may be supported, along with the ability to configure one or more bootstrap messages. A customer care server such as the customer care server 157 may support a simple graphical user interface (UI) to allow OMA DM compatible electronic devices to be bootstrapped, and for commands to be issued to allow the electronic device to be explored and configured via a browser such as, for example, an Internet browser.

In one representative embodiment of the present invention, the code to support OMA DM-based device management for customer care activities of a customer care server (e.g., customer care server 157 of FIG. 1) is shared with an OMA DM-based application server. By employing a representative embodiment of the present invention, a system operator ensures that an application server and a customer care server produce identical behavior in their interactions with electronic devices under OMA DM-based device management.

An OMA DM common framework in accordance with one representative embodiment of the present invention provides for the real-time sharing of data by multiple OMA DM Based applications, and may include sharing of the data from a DM tree in an electronic device such as the electronic device 107 of FIG. 1. In a representative embodiment of the present invention, each OMA DM-based application may access the data used to create OMA DM commands for the electronic device.

Currently, each manufacturer of an electronic device such as the electronic device 107 of FIG. 1 may place electronic device setting parameters (e.g., GPRS setting) in different locations within the DM tree of an electronic device they manufacture. This may cause the node uniform resource identifier (URI) of a given parameter to be different for each electronic device make, model, and version (MMV). Some representative embodiments of the present invention provide a data store to be used in managing DM tree information. Such a data store may hold single device information such as the international mobile equipment identity (IMEI) of the electronic device, a password, and a nonce, to name only a few examples. Some data may be customized for each OMA DM-based application including, for example, the type of authentication scheme to be used, and bootstrap content. Some representative embodiments of the present invention allow a user of a customer care system to modify the bootstrap content, to specify the security type and profile type for devices. The security type may, for example, be one or both of "Networkpin" and "Userpin". Some representative embodiments of the present invention permit notification and bootstrap functionality to be shared by OMA DM-based customer care and application servers such as the customer care server 157 and DM server 109 of FIG. 1, for example. Such an arrangement permits a user of the customer care server to specify, for example, a short message service center (SMSC) to be used for the sending of notification and bootstrap messages. Some representative embodiments of the present invention provide this functionality through a set of APIs and call back services that support the sending of DM commands and receipt of results.

Figure 2:
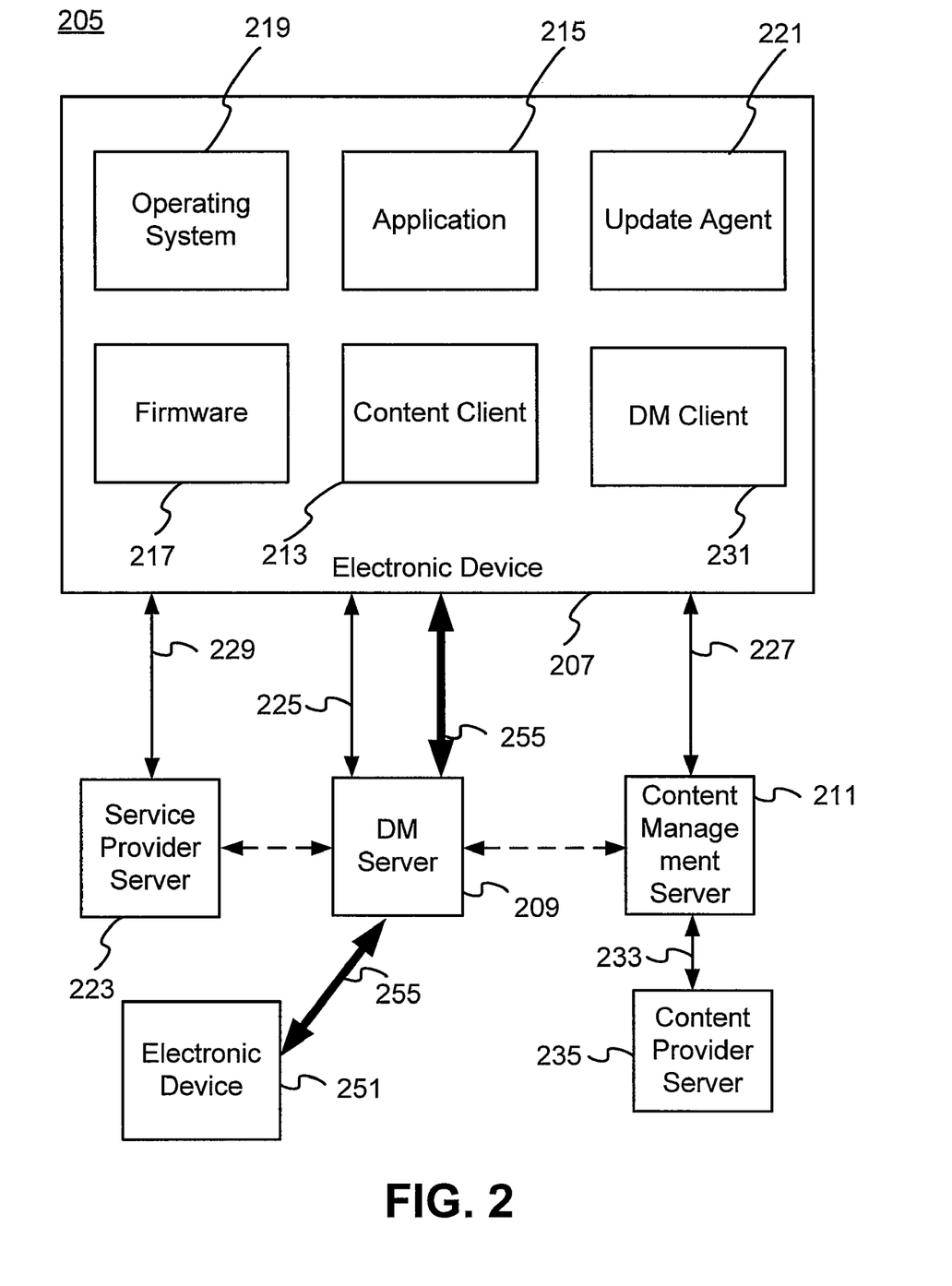
FIG. 2 is a perspective block diagram of an exemplary network that supports determining device management needs and conducting device management operations on a plurality of electronic devices using a broadcast or multi-point transport protocol such as, for example, WiMAX, in accordance with a representative embodiment of the present invention.

FIG. 2 is a perspective block diagram of an exemplary network 205 that supports determining device management needs and conducting device management operations on a plurality of electronic devices using a broadcast or multipoint transport protocol such as, for example, WiMAX, in accordance with a representative embodiment of the present invention. As shown in the illustration of FIG. 2, in one representative embodiment of the present invention the network 205 comprises electronic devices 207, 251 that may correspond to, for example, the electronic device 107 of FIG. 1. In a representative embodiment of the present invention, the electronic device 207 comprises an operating system (OS) 219, application software 215, one or more update agents 221, firmware 217, one or more content clients 213, and a DM client 231. The network 205 also comprises a service provider server 223, a DM server 209, and a content management server 211. The electronic device 207 communicates with the DM server 209 via communication paths 225, 255, with the service provider server 223 via communication path 229, and with the content management server 211 via communication paths 227. The DM server 209 may correspond to, for example, the DM server 109 of FIG. 1. As illustrated in FIG. 2, DM server 209 is enabled to communicate with additional electronic devices 251 via additional communication paths 255. Although not shown in the illustration of FIG. 2, the electronic device 207 also comprises interfaces use to communicate over the communications paths 223, 225, 227, 229, and 255, that have been omitted from the illustration solely to improve clarity to aid in understanding the figure.

In a representative embodiment of the present invention, the electronic devices 207, 251 support applications and/or features the use of which may involve device management operations, e.g., provisioning, installation of software and/or firmware, updates to software/firmware/configuration parameters or personalization.

In a representative embodiment of the present invention, the electronic device 207 can be used to request device management services via a device management (DM) server such as, for example, the DM server 209 of FIG. 2. The content manager server 211 provides a service to the user/subscriber of the electronic device 207, by retrieving personalization content, as necessary, and forwarding it to the electronic device 207.

The network 205 in a representative embodiment of the present invention supports management of electronic devices 107, 151 using a device management protocol that employs a broadcast or multipoint (i.e., multi-cast) transport protocol. The individual electronic devices that engage in device management operations with a DM server such as, for example, the DM server 209 are identified by information/identifiers such as, for example, the make, the model, and the version (MMV) of the electronic device engaged in DM operations including, for example, electronic device identification information and subscriber identification information. In one representative embodiment of the present invention, the DM server 209 conducts DM operations with one electronic device at a time, employing a point-to-point transport protocol (such as the hypertext transport protocol (HTTP)). The DM server (e.g., DM server 209) of a representative embodiment of the present invention is also capable of conducting DM operations with a plurality of electronic devices at the same time, employing a multi-point transport protocol such as, for example, the IEEE 802.16 d/e protocols (a.k.a., fixed and mobile WiMAX, respectively). Other representative embodiments of the present invention employ a combination of point-to-point protocols and multi-point protocols in the network 205. For example, in one representative embodiment of the present invention, a DM server such as, for example, the DM server 209 employs an Open Mobile Alliance (OMA) device management (DM) protocol carried over the HTTP protocol, to configure individual electronic devices (e.g., electronic device 207) with device-specific or subscriber-specific information. In another representative embodiment of the present invention, the DM server 209 employs an OMA-DM protocol transported over WiMAX (IEEE 802.16 d/e) to concurrently or simultaneously bootstrap electronic device such as, for example, the electronic devices 207,251. In such a representative embodiment, such bootstrapping activity employs a device management account (DMAcc) or other connectivity management objects or connectivity parameters. Such device management accounts (DMAccs), connectivity management objects and connectivity parameters may be electronic device agnostic, and be common or generic to all electronic devices and user accounts supported by the network 205.

In a representative embodiment of the present invention, OMA DM and/or OMA client provisioning (CP)-based bootstrap provisioning is conducted using broadcast or multipoint transport protocols using OMA-DM commands. A representative embodiment of the present invention supports communication of packages of firmware and/or software update information to a plurality of electronic devices (e.g., electronic devices 207, 251) using OMA-DM commands communicated over broadcast or multipoint/multi-cast transport protocols. In addition, a representative embodiment of the present invention permits individual electronic devices (e.g., electronic device 207) to be configured using point-to-point transport protocol such as, for example, HTTP, in order to enable them to participate in subsequent device management operations using OMA-DM commands and messages distributed using broadcast or multi-cast device management sessions employing a broadcast or multipoint/multicast transport protocol.

A DM server such as, for example, the DM server 209, in a representative embodiment of the present invention employs handset control and/or enterprise control management objects (MOs) to enable electronic device management operation such as, for example, device wipe, device lock, device unlock, to name only a few operations. Managements objects and their nodes and sub-nodes of representative embodiments of the present invention are extensions to those defined by a device management protocol such as, for example, the Open Mobile Alliance (OMA) device management (DM) V1.2 protocol, developed under the direction of the Open Mobile Alliance, Ltd. For example, in a representative embodiment of the present invention, a DM server (e.g., the DM server 209) sends one or more commands to a DM client (e.g., the DM client 231) of an electronic device (e.g., the electronic devices 207, 251), instructing the DM client 231 in the electronic device 207, 251 to set identified management objects in a management tree stored in memory (e.g., non-volatile memory) of the electronic devices 207, 251 to particular values. The management objects managed by the DM server 209 and the DM client 231 of the mobile device 207 may, for example, direct the electronic device 207 to consume data and content from specific authorized service providers and servers.

In one representative embodiment of the present invention, a DM server (e.g., the DM server 209) employs OMA-DM commands and messages transported over, for example, the HTTP protocol, to instruct a DM client in an electronic device (e.g., the DM client 231 of electronic device 207) to set up a firmware update management object (FUMO) in the management tree of the electronic device. The DM server subsequently delivers a package of update information to the electronic device and to other similar electronic devices, using a broadcast transport mechanism (e.g., a broadcast protocol). In a representative embodiment of the present invention, the electronic devices 207, 251, and other similar electronic devices, determine whether the broadcast update package is intended for them, and if so, store the received update package in memory of the electronic device for subsequent processing. In a representative embodiment of the present invention, the DM server 209, for example, then sends an OMA-DM message invoking an OMA DM "Exec" command on the FUMO node associated with the received update package present in each of the electronic devices. Invoking the "Exec" command using a broadcast based transport protocol over communication path 255 then starts the update process in each of electronic devices that received and stored the update package. The individual electronic devices (e.g., electronic devices 207, 251) that respond to the "Exec" command received from the DM server 209 conduct update activities and, subsequently, send the results of the update activity (e.g., result codes, status information, etc.) to the DM server 209 using OMA-DM protocols transported by a point-to-point (e.g., HTTP) transport protocol. In one representative embodiment of the present invention, at the end of an update activity, each of the electronic devices (e.g., electronic devices 207, 251) then communicates an OMA DM Alert 1226-based message (also referred to as a "Generic Alert" message) to a DM server (e.g., the DM server 209) over communication path 225, using the OMA-DM protocol carried by an HTTP transport protocol.

In one representative embodiment of the present invention, the DM clients (e.g., DM client 231) in the electronic devices 207, 251 are configured to monitor a broadcast channel that provides device management commands, messages and instructions to the DM clients. The monitoring of the broadcast channel is conducted per a schedule that is communicated to the electronic device. In addition, the device management commands, messages and instructions to the DM clients (e.g., DM client 231) are executed by the electronic device (e.g., electronic device 207) only after the DM client determines that the device management commands, messages and instructions to the DM clients are appropriate for the electronic device based upon, for example, the make, model, and version (MMV) information of the electronic device (e.g., electronic device 207).

Figure 3:
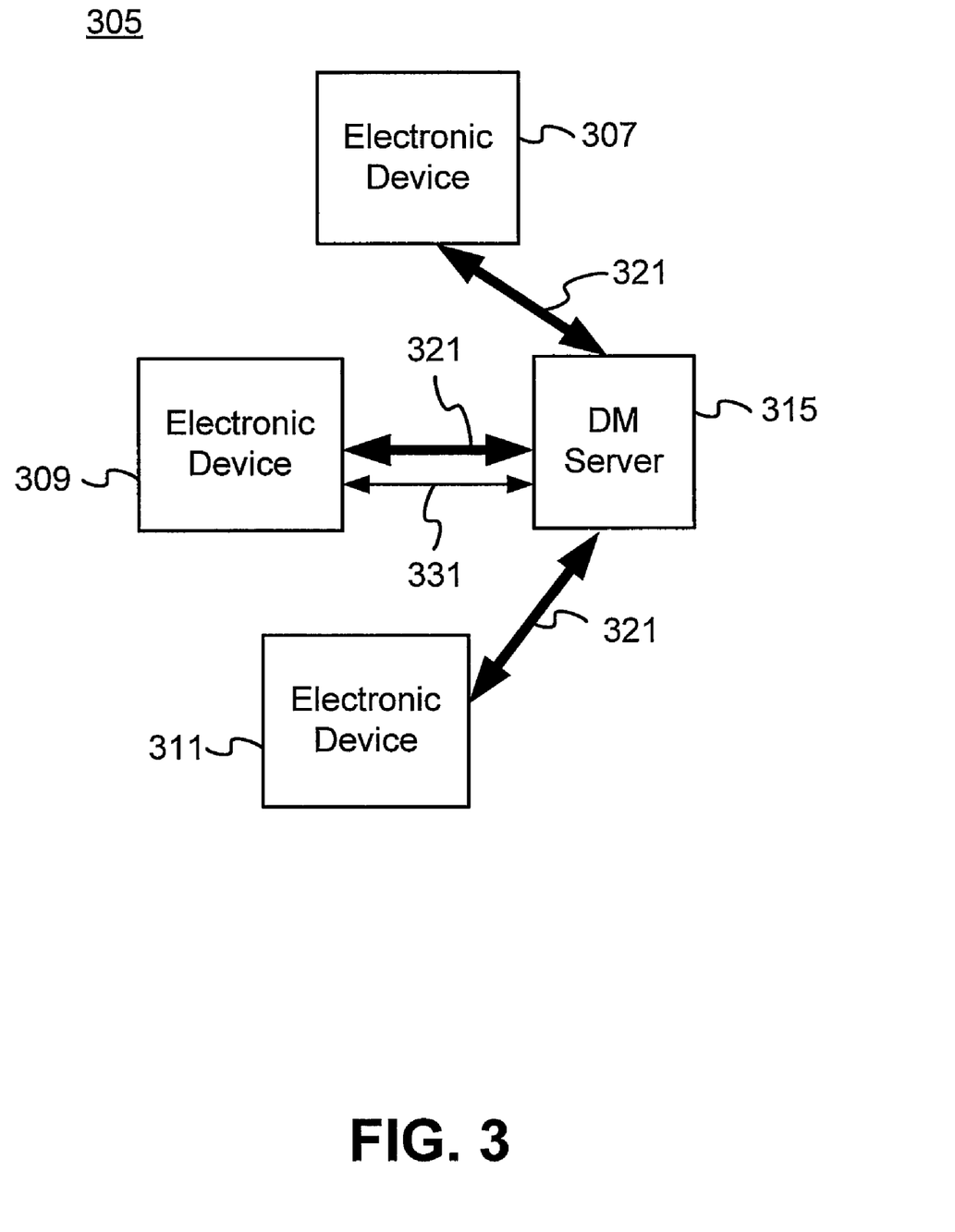
FIG. 3 is a perspective block diagram of an exemplary network that supports device management over broadcast and multicast transport protocols, wherein device management messages such as, for example, OMA DM messages are communicated to a plurality of electronic devices over broadcast and multicast transport protocols, in accordance with a representative embodiment of the present invention.

FIG. 3 is a perspective block diagram of an exemplary network 305 that supports device management over broadcast and multicast transport protocols, wherein device management messages such as, for example, OMA DM messages are communicated to a plurality of electronic devices 307, 309, 311 over broadcast and multicast transport protocols, in accordance with a representative embodiment of the present invention. The network 305 illustrated in FIG. 3 comprises electronic devices 307, 309, 311 that may correspond to, for example, the electronic devices 207, 251 of FIG. 2. The electronic devices 307, 309, 311 of FIG. 3 are communicatively coupled via communication paths 321 to DM server 315, that may correspond to, for example, the DM server 209 of FIG. 2. The communications paths 321 may comprise any of the wired or wireless networks previously mention above, including wired or wireless communication paths such as, for example, a local area network, a public switched telephone network, a wireless personal, local or wide area network, and a cellular or paging network, to name only a few possibilities. In a representative embodiment of the present invention, a DM client (e.g., the DM client 231 of FIG. 2) in each of the electronic devices 307, 309, 311 subsequently sends results such as, for example, result code(s), status information, and electronic device particulars related to those DM operations conducted, back to the DM server 215 using a point-to-point protocol. For example, in one representative embodiment of the present invention, the electronic device 309 communicates results of DM operations invoked during an OMA-DM session using a broadcast protocol 22, over a communication path 331 that employs an HTTP-based protocol.

Figure 4:
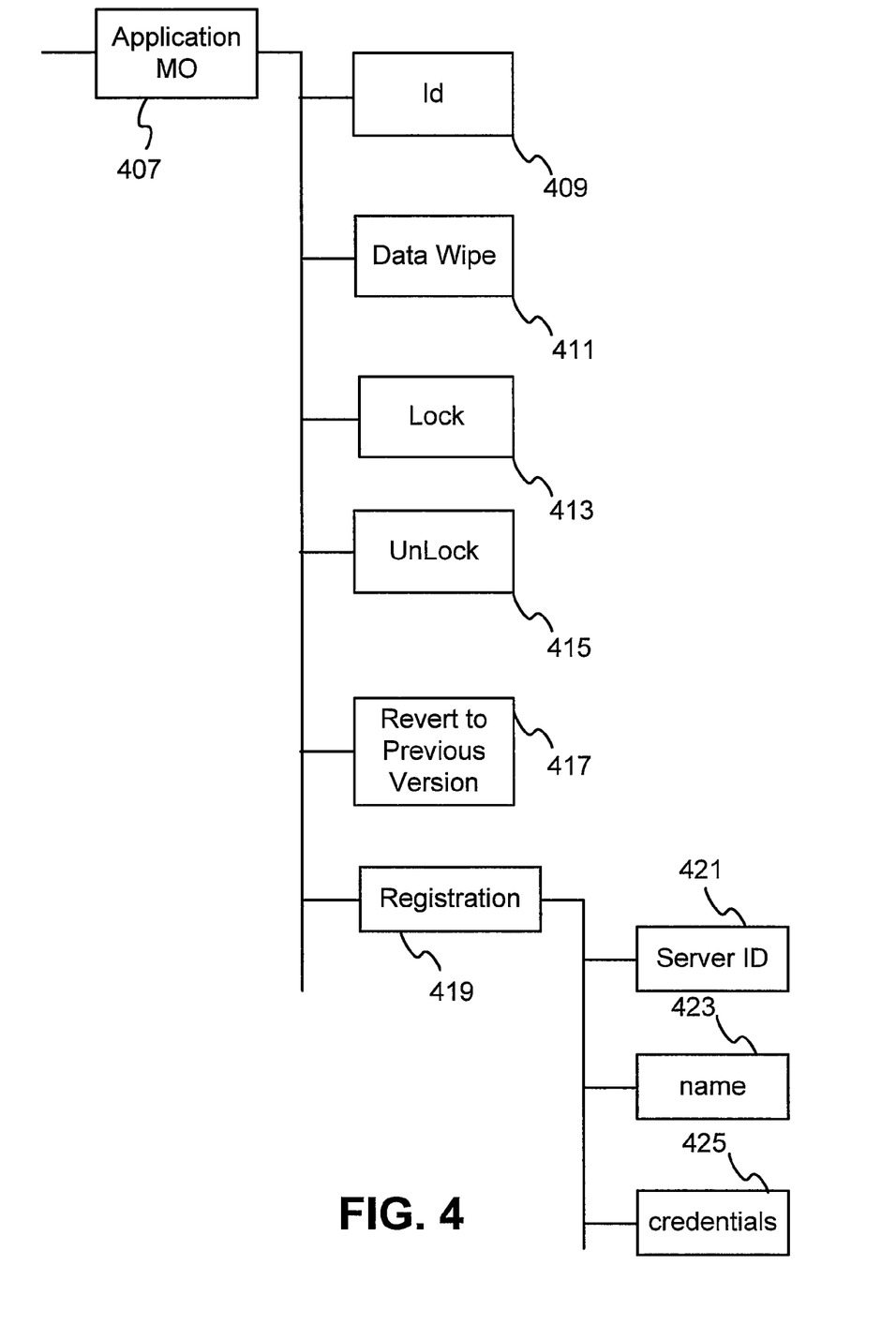
FIG. 4 is a perspective block diagram of an exemplary application management object (MO) that provides support for data wipe, device lock, device unlock, and other device management operations that are facilitated by a DM client in an electronic device such as, for example, the DM client of the electronic device of FIG. 2, in accordance with a representative embodiment of the present invention.

FIG. 4 is a perspective block diagram of an exemplary application management object (MO) 407 that provides support for data wipe, device lock, device unlock, and other device management operations that are facilitated by a DM client in an electronic device such as, for example, the DM client 231 of the electronic device 207 of FIG. 2, in accordance with a representative embodiment of the present invention. The application MO 407 may be stored in a device management tree in memory of an electronic device, such as the nonvolatile memory 111 of the electronic device 107 of FIG. 1, for example. A device management tree is a data structure that comprises a hierarchical arrangement of management objects that provide access to user and device parameters and functionality. The application MO 407 shown in FIG. 4 comprises an "application identification (ID)" node 409, a "data wipe" node 411, an application "lock" node 413, an application "unlock" node 415, a "revert to previous version" node 417, and a "registration" node 419. The "registration" node 419 is an interior node that comprises a "server ID" sub-node 421, a "name" sub-node 423, and a "credentials" sub-node 425.

In one representative embodiment of the present invention, the "application ID" node 409 is an identifier provided by a 3rd party vendor (e.g., of the application software) that is used to identify an application (e.g., application software 215) in an electronic device (e.g., the electronic device 207). In another representative embodiment, the "application ID" node may contain a standard identifier that is registered with a standards body such as, for example, the Open Mobile Alliance, Ltd. (OMA). The "data wipe" node 411 is a parameter or flag that can be set to a designated value by a DM server (e.g., DM server 209) to cause the DM client (e.g., DM client 231) in the electronic device (e.g., electronic device 207) to wipe (i.e., clear, remove, or destroy) any data associated with the application identified by the "application ID" mode 409. The "wipe" operation may comprise invoking functions or features provided by the application itself, or by an operating system (e.g., OS 219), that make it possible to determine where application data is located, how it can be deleted or erased, and how to report success or failure of the "wipe" operation back to the DM client (e.g., DM client 231), and ultimately to the managing DM server (e.g., DM server 209).

In a representative embodiment of the present invention, a lock node of an application MO such as, for example, the "lock" node 413 enables an application (e.g., the application software 215) to be locked so that it cannot be used or invoked again until it is has been "unlocked". This has utility when, for example, a user of an electronic device (e.g., electronic device 207) loses the electronic device. In such a situation, the user may choose to have a particularly important software application locked, to keep it from being misused. In one representative embodiment of the present invention, the user employs a web browser application in communication with a self-care portal accessible via the Internet, to cause the software application to be locked. In a representative embodiment of the present invention, the self-care portal is communicatively coupled to a DM server (e.g., DM server 209) that acts upon the user request placed through the self-care portal, to send the appropriate device management commands to a DM client (e.g., DM client 231) in the electronic device. The DM client of the electronic device then acts upon DM command to modify the "lock" node (e.g., the "lock" node 413) to cause the software application to be locked and unusable. In another representative embodiment of the present invention, the user may place a telephone call to a customer care representative (e.g., employed by the operator of the network 205, or the provider of the software application 215) and have the customer care representative lock the software application. In yet another representative embodiment of the present invention, a software application associated with a service is locked by a service provider, if the user's subscription to an associated service of the provider expires, or if the user decides to cancel an associated service of the provider.

In a representative embodiment of the present invention, an "unlock" node of an application MO such as, for example, the "unlock" node 315 enables a software application (e.g., the software application 215) to be unlocked and made available for use, if it has been in a "locked" condition. The software application may have been previously locked by, for example, an operator of the network 205 or the user of the electronic device 207 (e.g., via a self care portal), as described above. In a representative embodiment of the present invention, a DM server such as the DM server 209 of FIG. 2, for example, acts as the conduit for such locking and unlocking of software applications in an electronic device, and a DM client such as the DM client 231 of FIG. 2 provides device-side support for such activities.

Software applications in an electronic device such as the application software 215 of the electronic device 207 may be updated using software component update techniques. A user of the electronic device 207 may not, however, be satisfied with the results of such an update, and may wish to revert back to a previous version of the application software. In a similar way, an operator of the network 205, for example, may decide that an updated application (e.g., application software 215) has a negative impact on the performance of the network 205 and may want to revert the application software back to a previous version. In a representative embodiment of the present invention, a node of a management object such as, for example, the "revert to previous version" node 417 of the application MO 407 of FIG. 4 provides a means to handle such operations. A DM server such as, for example, the DM server 231 issues device management commands to set the "revert to previous version" node 417 associated with the software application to a designated value, to cause a DM client in the electronic device (e.g., DM client 231 of electronic device 207) to take appropriate actions to revert the software application back to the previous version. In one representative embodiment of the present invention, this action involves the download of software and/or firmware components, and an update of memory in the electronic device, using such downloaded components. In another representative embodiment of the present invention, this action involves the creation of the earlier version of the application software in the memory of the electronic device, using the current version of the application software. In yet another representative embodiment of the present invention, this action involves the restoring to a usable state from a backup memory, an earlier version of the software application.

In a representative embodiment of the present invention, a "registration" node of an application MO such as, for example, the "registration" node 419 of application MO 407 enables a DM server such as, for example, the DM server 209 to register one or more servers, with a software application in an electronic device such as the application software 215, for example. In one representative embodiment, the identities of the servers to be registered with the software application identified in the application MO 407 are provided via a "server ID" sub-node, shown in FIG. 4 as the "server ID" sub-node 421. A "name" sub-node, shown in FIG. 4 as "name" sub-node 423, provides for storage of a registered name associated with the application MO 407. Credentials for authorizing and/or authenticating the application software the identified servers are provided in a "credentials" sub-node 425. Through the use of the "registration" node 419 and its "server ID" sub-node 421, "name" sub-node 423, and "credentials" sub-node 425, the application software is made aware of servers with which it can communicate data or content (e.g., multimedia content) for consumption by a user. Application software on the electronic device 207 such as, for example, MP3 players or media players, may consume streaming media provided to them by one or more authorized servers. In one representative embodiment of the present invention, content provided by unauthorized servers is ignored and/or deleted unless the user indicates their approval for the display/rendering of such content from such unauthorized sources. The "registration" node of a representative embodiment of the present invention provides a means for specifying authorized sources of data and content to individual software applications.

Figure 5:
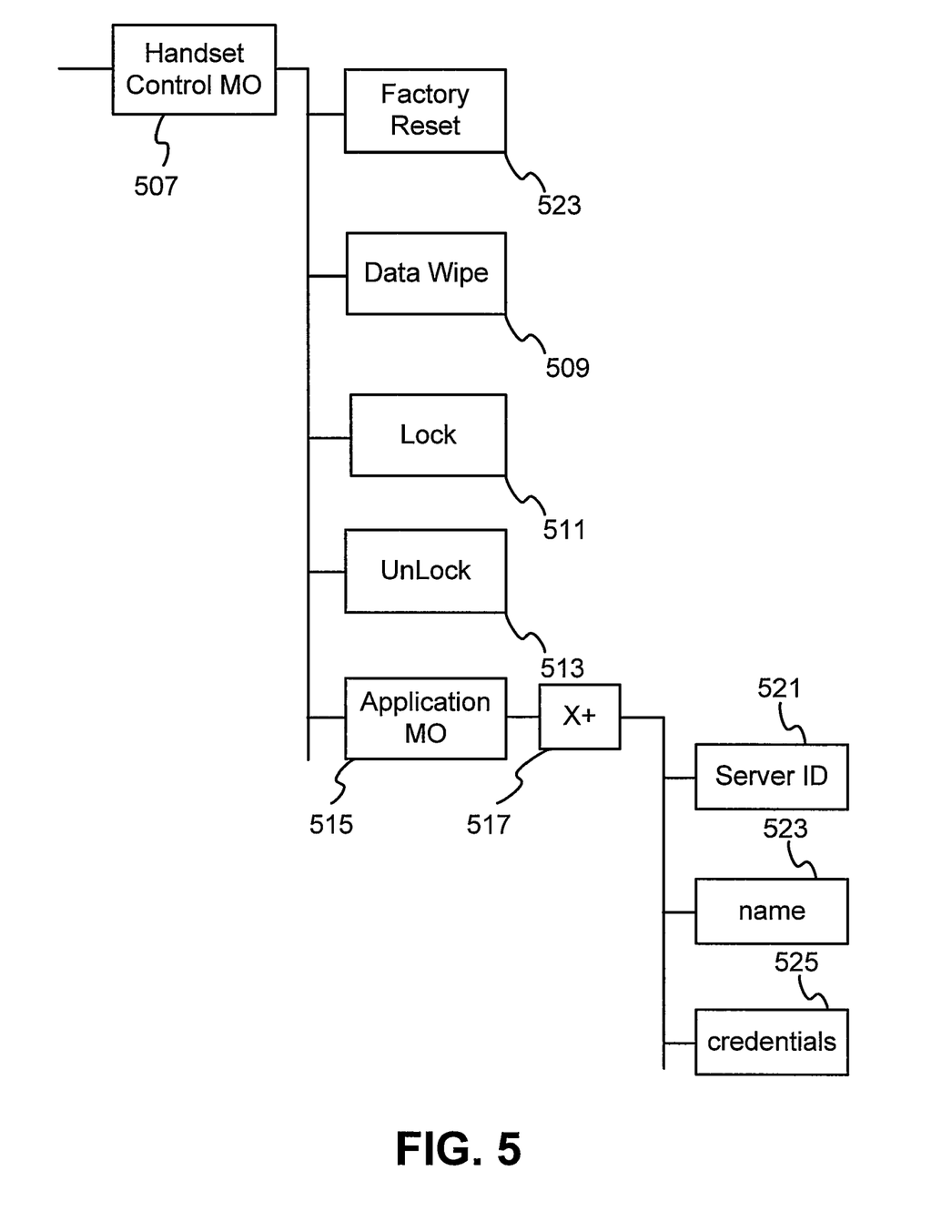
FIG. 5 is a perspective block diagram of an exemplary handset control management object (MO) that supports data wipe, device lock, device unlock, and other device management operations that are facilitated by a DM client such as the DM client of the electronic device of FIG. 2, in accordance with a representative embodiment of the present invention.

FIG. 5 is a perspective block diagram of an exemplary handset control management object (MO) 507 that supports data wipe, device lock, device unlock, and other device management operations that are facilitated by a DM client such as the DM client 231 of the electronic device 207 of FIG. 2, in accordance with a representative embodiment of the present invention. In a representative embodiment of the present invention, the handset control MO 507 is stored in a device management tree in memory of an electronic device, such as the nonvolatile memory 111 of the electronic device 107 of FIG. 1, for example. The handset control MO 507 shown in FIG. 5 comprises a "factory reset" sub-node 523, a "data wipe" sub-node 509, a "device lock" sub-node 511, a "device unlock" sub-node 513, and an application MO sub-node 515 that provides application-to-authorized-server mapping.

In a representative embodiment of the present invention, a "factory reset" sub-node such as the "factory reset" sub-node 523 of FIG. 5 permits a DM server such as the DM server 209 of FIG. 2 to invoke a factory reset operation upon an electronic device such as the electronic device 207 of FIG. 2. In a representative embodiment of the present invention, a "factory reset" of the electronic device 207 is initiated by the DM server 209 when the "factory reset" sub-node 523 is set to a designated value (e.g., the value "1"). This action causes the DM client 231 to, for example, invoke a configuration and/or a firmware update operation in the electronic device 207, resetting the firmware and configuration in the electronic device 207 to a predefined configuration and set of values for the electronic device (e.g., those installed at the time the electronic device was manufactured.) If, for example, the firmware and/or software and configuration information of the electronic device 207 have not been changed by the user since the electronic device was initially purchased, then no additional DM operations (e.g., configuration, firmware updates, etc.) may be involved as part of a "factory reset". If the user of the electronic device 207 has made software, firmware and or configuration changes, or stored personal data on the electronic device, a "data wipe" operation may be involved in restoring a "factory reset" condition. Such a "data wipe" operation to remove user data may be performed according to the policies of the operator of the network 205, the manufacturer of the electronic device 207, or a third party.

In a representative embodiment of the present invention, a "data wipe" sub-node such as the "data wipe" sub-node 509 of FIG. 5 is a parameter or flag that can be set to a designated value by a DM server (e.g., DM server 209) to cause the DM client (e.g., DM client 231) in the electronic device (e.g., electronic device 207) to wipe (i.e., clear, remove, or destroy) any data associated with all application software in the electronic device 207. For example, in one representative embodiment of the present invention, user address book entries and email messages are deleted in response to the invocation of a data wipe operation. For example, the setting of the "data wipe" sub-node 509 by a DM server causes the DM client 231 to invoke an address book application and/or an email client in the electronic device 207 to conduct data cleanups for their respective user data. In a representative embodiment of the present invention, activating or invoking a "data wipe" operation via the setting of a "data wipe" sub-node such as the "data wipe" sub-node 509 comprises invoking functions and/or features provided by the applications software (application software 215), or by an operating system (e.g., OS 219). In a representative embodiment of the present invention, the application software determines where the respective data is located, how it is deleted or erased, performs the cleanup, and determines how the success or failure of the data wipe operation is to be reported back to the DM client 231 and, therefore, to the DM server 209.

In a representative embodiment of the present invention, a "device lock" sub-node such as the "device lock" sub-node 511 enables a DM server (e.g., the DM server 231) to lock the electronic device 207. In one representative embodiment, the device lock operation includes all application software (e.g., the application software 215 of FIG. 2) so that the electronic device 207 is unavailable for further use. In other representative embodiments of the present invention, all application software except for emergency-related operations such as, for example, calling police or 911 are locked and made unavailable for further use. In a representative embodiment of the present invention, such a "device lock" condition is maintained so that the electronic device cannot be used and any applications software cannot be invoked, until the electronic device is "unlocked". This aspect of the present invention is desirable when the electronic device 207 is stolen, or if it is misplaced by the user. In such a situation, the user may choose to have the electronic device 207 (including, for example, all applications software on the electronic device) locked, to stop the electronic device 207 from being misused. In one representative embodiment of the present invention, the user employs a web browser to access, via the Internet, a self-care portal that is communicatively coupled to a DM server such as the DM server 231, for example. This permits the user to cause a "device lock" sub-node (e.g., the "device lock" sub-node 511) in a "handset control" MO in the electronic device to be set to a designated value, thereby causing the electronic device to be locked. In another representative embodiment of the present invention, the user may call and speak with a customer care representative to request that the customer care service lock the electronic device (e.g., electronic device 207). In yet another representative embodiment, a provider of a service to which the user is subscribed may employ a "device lock" sub-node such as the "device lock" sub-node 511, if a user's subscription to a service expires, or if the user decides to cancel the subscription.

In a representative embodiment of the present invention, a "device unlock" sub-node such as, for example, the "device unlock" sub-node 513 shown in FIG. 5 enables a DM server (e.g., the DM server 231) to unlock the electronic device 207, such that it can be used again by a user. As described above in regards to the "device lock" sub-node 511, an electronic device such as the electronic device 207 may be locked by a system operator, or by a user (e.g., via a self care portal). In some representative embodiments of the present invention, the electronic device 207 must then be unlocked In order to again be made usable. In one representative embodiment of the present invention, the user employs a web browser to access, via the Internet, a self-care portal that is communicatively coupled to a DM server such as the DM server 231, for example. This permits the user to cause a "device unlock" sub-node (e.g., the "device lock" sub-node 513) in a "handset control" MO in the electronic device to be set to a designated value, thereby causing the electronic device to be unlocked. In another representative embodiment of the present invention, the user may call and speak with a customer care representative to request that the customer care service unlock the electronic device (e.g., electronic device 207). In yet another representative embodiment, a provider of a service to which the user was subscribed or to which the user would like to subscribe may employ a "device unlock" sub-node such as the "device unlock" sub-node 513, following reinstatement of a user's expired subscription to a service, or if the user decides to enter into a subscription to a service. In one representative embodiment of the present invention, the receipt of a device management command to set a "device unlock" sub-node in the electronic device to a designated value causes the DM client 231 to invoke or initiate functions in the application software in the electronic device (e.g., application software 215 in the electronic device 207) to make the application software 215 once again available for use. Such a device management command may be sent to the electronic device 207 by a DM server such as the DM server 209, for example.

In one representative embodiment of the present invention, individual software applications (e.g., application software 215) are managed using software component update techniques, and may be managed by particular service providers (i.e., by the servers associate with a service provider). To provide an authorization mechanism and to prevent unauthorized access to applications by servers, a representative embodiment of the present invention supports establishment and maintenance of a mapping between software applications in an electronic device such as, for example, the application software 215 of the electronic device 207, and the servers that are authorized to manage the software application and/or provide content to the software application. In a representative embodiment of the present invention, an application MO such as, for example, the application MO 515 of FIG. 5 in a device management tree of an electronic device (e.g., the electronic device 207) enables a device management server (e.g., DM server 209) to remotely manage a list of servers X+ 517 for the software application associated with the application MO 515. In a representative embodiment of the present invention, each authorized server in the list of servers X+ 517 has an associated "server ID" sub-node 521, a "name" sub-node 523, and a "credentials" sub-node 525, for each application. In some representative embodiments of the present invention, the servers in the list of servers X+ 517 comprises one or more servers that are authorized to provide content to the electronic device 207 such as, for example, streaming media (e.g., audio, video, etc.), configuration parameters and information, user preferences, service provider/network operator policies, to provide just a few examples. In some representative embodiments of the present invention, servers in the list of servers X+ 517 comprises those server that are authorized to manage the application software associated with application MO 515, and/or to provide content. In a representative embodiment of the present invention, servers not present in the list of servers X+ 517 are not allowed to manage or provide content to the application associated with the application MO 515. In some representative embodiments of the present invention, an additional leaf/sub-node (not shown in FIG. 5) that may be named, for example, "role" is provided for each server in the list of servers X+ 517. The "role" sub-node can take one or more values associated with the roles of, for example, "manage", "provide content", and "configure".

In a representative embodiment of the present invention, an application node such as the application MO node 415 is used for registration of each of a list of servers X+ 517, associated with each application. The list of servers X+ 517 enables registration of one or more servers (e.g., via the associated "server ID" sub-node 521 and the associated "credentials" sub-node 525) with the application software (e.g., application software 215 of FIG. 2). In this way, the application software is made aware of servers that are authorized to communicate data or content to the electronic device for playback/display to the user.

Figure 6:
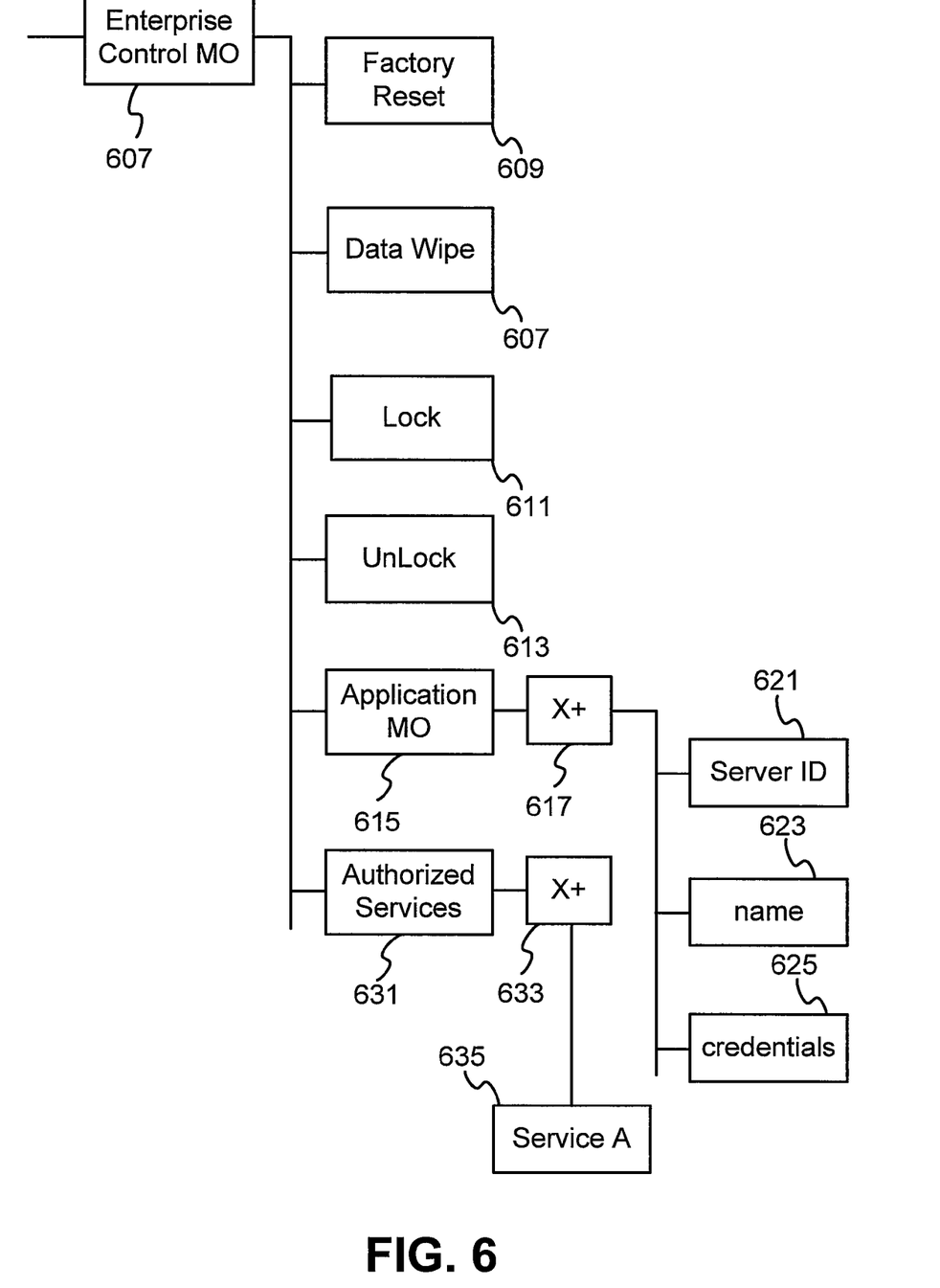
FIG. 6 is a perspective block diagram of an exemplary enterprise control MO that may be employed by an enterprise such as, for example, a business enterprise, to manage electronic devices such as the electronic device of FIG. 2, for example, over which the enterprise wants to exercise control, in accordance with a representative embodiment of the present invention.

FIG. 6 is a perspective block diagram of an exemplary enterprise control MO 607 that may be employed by an enterprise such as, for example, a business enterprise, to manage electronic devices such as the electronic device 207 of FIG. 2, for example, over which the enterprise wants to exercise control, in accordance with a representative embodiment of the present invention. In some instances, electronic devices such as the electronic device 207 of FIG. 2, for example, are subsidized and managed by a system or network operator such as a wireless service provider, for example. In other instances, electronic devices such as the electronic device 207 are subsidized and managed by an enterprise, such as a business or non-profit organization. In a representative embodiment of the present invention, an enterprise control MO such as, for example, the enterprise control MO 607 of FIG. 6 enables control of an electronic device (e.g., the electronic device 207) by an authorized enterprise. In a manner similar to the management operations support for a system/network operator that is provided by the handset control MO 507 of FIG. 5, the enterprise control MO 607 of a representative embodiment of the present invention provides support for factory reset, data wipe, device lock, device unlock, and application software management operations described above via "factory reset" sub-node 623, "data wipe" sub-node 609, "device lock" sub-node 611, "device unlock" sub-node 613, and an application MO 615. In addition, some representative embodiments of the present invention comprise an "authorized services" sub-node 631 that supports the specification of services that an enterprise-managed electronic device (e.g., the electronic device 207) is authorized to provide. For example, an enterprise-managed electronic device such as the electronic device 207, for example, may be authorized to enable use of a special email client application, a customized media player, and/or an enterprise data access service, to name only a few examples.

An enterprise may choose to restrict an electronic device such as the electronic device 207, for example, to enable use of only those specialized (e.g., enterprise-specific applications) applications or services that the enterprise has authorized. An "authorized services" sub-node of an enterprise control MO in accordance with a representative embodiment of the present invention such as, for example, the "authorized services" sub-node 631 of FIG. 6, provides a list of those services authorized by the manager of the enterprise for use in the electronic device. In some representative embodiments of the present invention, the list of service in the "authorized services" sub-node 631 is maintained by a DM server (e.g., the DM server 209 of FIG. 2) using an OMA-DM v1.2 compliant protocol.

In one representative embodiment of the present invention, the list of services contained in the "authorized services" sub-node 631 are those services to be affected when, for example, the "data wipe" sub-node 607 is set to the value designated to initiate a wiping/clearing/erasing of data. In a representative embodiments of the present invention, if a user attempts to download a new software application for a service (e.g., application software 215 of FIG. 2), a DM client such as the DM client 231 of the electronic device 207 of FIG. 2, for example, checks whether the new software application is authorized for use on the electronic device 207. In one representative embodiment of the present invention, if the DM client 231 determines that the new software application is not authorized by the enterprise, the DM client 231 warns the user that such a software application should not be downloaded or installed. In another representative embodiment, the DM client 231 does not permit the user to download or install the unauthorized software application. Based upon the information residing in the "authorized services" sub-node 631, a representative embodiment of the present invention does not permit a user to delete, remove, or otherwise disable an authorized software application.

Figure 7:
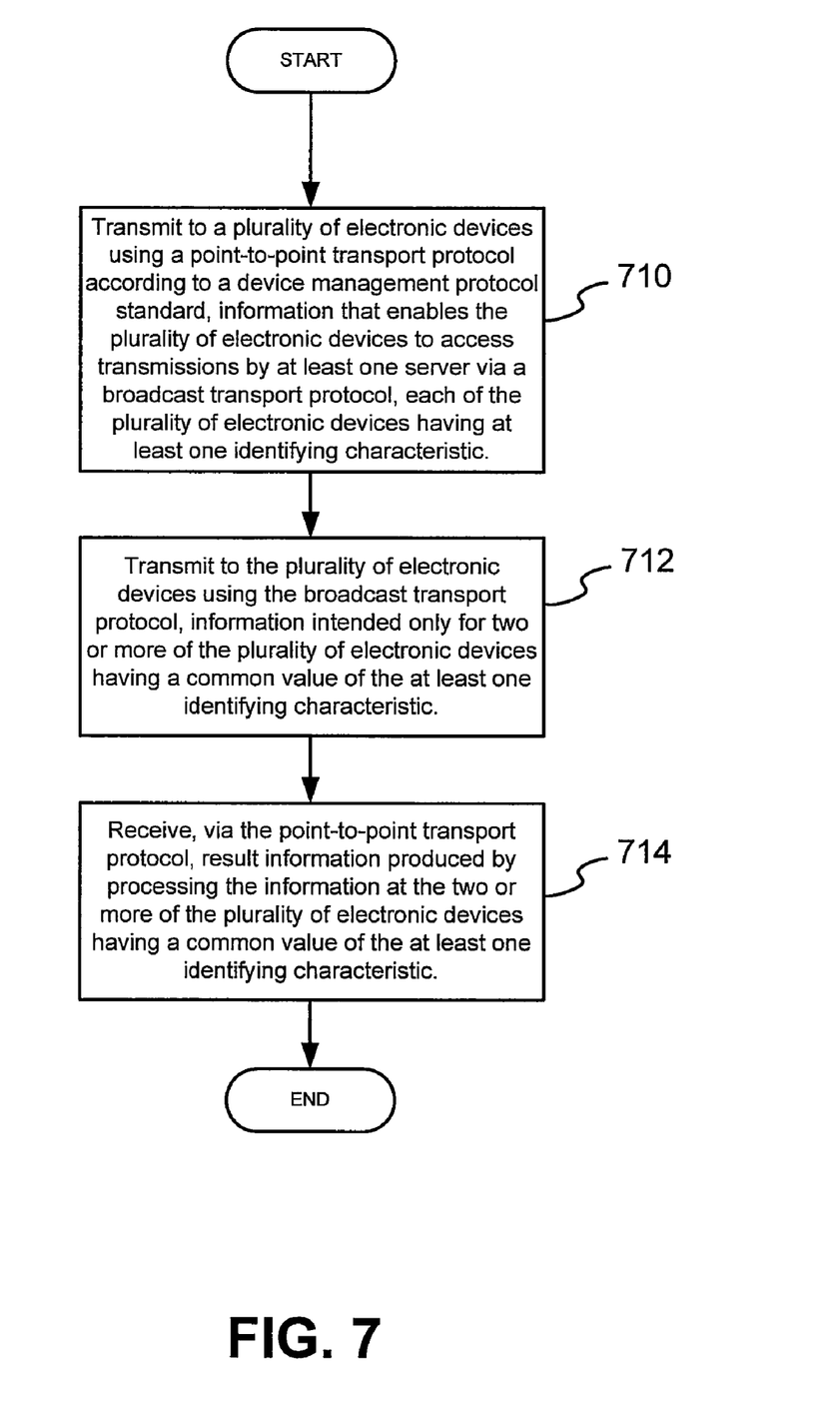
FIG. 7 is a flowchart for an exemplary method of operating a server to perform device management activities upon a plurality of electronic devices having at least one identifying characteristic, in accordance with a representative embodiment of the present invention.

FIG. 7 is a flowchart for an exemplary method of operating a server to perform device management activities upon a plurality of electronic devices having at least one identifying characteristic, in accordance with a representative embodiment of the present invention. The method of FIG. 7 begins at block 710, when a server such as, for example, the DM server 209 of FIG. 2 transmits to a plurality of electronic devices (e.g., the electronic device 207 of FIG. 2) using a point-to-point transport protocol according to a device management protocol standard. In a representative embodiment of the present invention, the information transmitted using the point-to-point transport protocol enables the plurality of electronic devices to access transmissions by the server via a broadcast transport protocol. This information may comprise any of a number of pieces of information including information that identifies a broadcast transport path such as a wireless network, and/or a channel or frequency. In a representative embodiment of the present invention, each of the plurality of electronic devices has at least one identifying characteristic such as, for example, the make, model, and/or version of the electronic device. Next, at block 712, the server transmits to the plurality of electronic devices using the broadcast transport protocol, information intended only for two or more of the plurality of electronic devices having a common value of the at least one identifying characteristic. The transmission over the broadcast transport protocol includes the identifying characteristic of the two or more of the plurality of electronic devices for whom the transmission is intended. In this manner, a representative embodiment of the present invention is enabled to efficiently distribute device management information to subgroups of a larger population of electronic devices, using a broadcast or multicast path. Each of the two or more electronic devices processes the received information that may, for example, be used for updating memory in the electronic devices. Finally, at block 714, the server receives, via the point-to-point transport protocol, result information produced by processing of the information transmitted to the two or more of the plurality of electronic devices having a common value of the at least one identifying characteristic. For example, the electronic devices receiving the information transmitted using the broadcast transport protocol may process the information, and may return a result code that indicates the success or failure of the processing at the receiving electronic device(s).

Although a system and method according to the present invention has been described in connection with the preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, a representative embodiment of the present invention may be realized in hardware, software, or a combination of hardware and software. Representative embodiments of the present invention may be realized in a centralized fashion in at least one computer system, or in a distributed fashion where different elements are spread across several interconnected computer systems. Any kind of computer system or other apparatus adapted for carrying out the methods described herein is suited. A combination of hardware and software may be a general-purpose computer system with a computer program that, when being loaded and executed, controls the computer system such that it carries out the methods described herein.

A representative embodiment of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While aspects of the present invention have been described with reference to certain embodiments, it will be understood by those skilled in the art that various changes may be made and equivalents may be substituted without departing from the scope of the representative embodiments of the present invention. In addition, many modifications may be made to adapt a particular situation or material to the teachings of a representative embodiment of the present invention without departing from its scope. Therefore, it is intended that embodiments of the present invention not be limited to the particular embodiments disclosed herein, but that representative embodiments of the present invention include all embodiments falling within the scope of the appended claims.

What is claimed is:

1. A system supporting device management for a plurality of mobile electronic devices in a mobile communications network using point-to-point and broadcast transport protocols, the system comprising:

at least one device management server that transmits to one of the plurality of mobile electronic devices using a point-to-point transport protocol according to a device management protocol standard, first information that enables access to the at least one device management server by the one of the plurality of mobile electronic devices, and second information that enables the one of the plurality of mobile electronic devices to receive device management information using the broadcast transport protocol;

the point-to-point transport protocol is used to communicate at least result information sent by the one of the plurality of mobile electronic devices to the at least one device management server, and the point-to-point transport protocol is used to enable the plurality of mobile electronic devices to participate in subsequent device management operations using the broadcast transport protocol;

device management accounts, connectivity management objects, and connectivity parameters, that are electronic device agnostic and generic to all of the plurality of mobile electronic devices, are updated using the broadcast transport protocol to minimize impact of device management activities on the mobile communications network and on use of the plurality of mobile electronic devices; and wherein the plurality of mobile electronic devices are from an enterprise, and an enterprise control management object in the plurality of electronic devices enables electronic device agnostic control of the plurality of mobile electronic devices by an authorized enterprise.

2. The system according to claim 1, in which the one of the plurality of mobile electronic devices employs the first information to enable reception of the second information.

3. The system according to claim 1, in which the first information is accessible in memory of the one of the plurality of mobile electronic devices as a device management object that is an extension of device management objects defined by the device management protocol standard.

4. The system according to claim 1, in which the at least one device management server disables and enables user access to at least one software application in the one of the plurality of mobile electronic devices using a device management object that is an extension of device management objects defined by the device management protocol standard.

5. The system according to claim 1, further comprising at least one sub-node of the enterprise control management object, the at least one sub-node specifying services that the plurality of mobile electronic devices are authorized to use.

6. The system according to claim 1, further comprising at least one sub-node of the enterprise control management object, the at least one sub-node restricting services that the plurality of electronic devices are authorized to use.

7. A handheld electronic device comprising:

at least one processor operable to communicate using a point-to-point transport protocol and a broadcast transport protocol for managing or providing content to software applications in the electronic device;

non-volatile memory operably coupled to the at least one processor, wherein the non-volatile memory comprises code executable by the at least one processor to receive and process information according to a device management protocol standard;

wherein the electronic device receives first information using the point-to-point transport protocol, the first information enabling reception of second information using the broadcast transport protocol; and wherein a result of processing the second information is transmitted by the electronic device to a remote server using the point-to-point transport protocol; and a mapping between software applications in the electronic device and servers authorized to manage or provide content to the software applications.

8. The electronic device according to claim 7 in which the point-to-point transport protocol operates over a public wireless network, and in which the electronic device comprises a cellular handset.

9. The electronic device according to claim 7, in which the broadcast transport protocol is an Institute of Electrical and Electronics Engineers, Inc. (IEEE) 802.16d or IEEE 802.16e compatible protocol, and in which the device management protocol standard is an Open Mobile Alliance (OMA) version 1.2 or earlier compatible device management protocol.

10. The electronic device according to claim 7 in which the first information is accessible in the non-volatile memory as a device management object that is an extension of device management objects defined by the device management protocol standard.

11. The electronic device according to claim 7 in which the remote server disables and enables user access to at least one software application in the electronic device using a device management object that is an extension of device management objects defined by the device management protocol standard.

12. The electronic device according to claim 7 further comprising an application management object in a device management tree of the electronic device, the application management object enabling a device management server to remotely manage a list of servers authorized to manage or provide content to the software applications associated with the application management object.

13. The electronic device according to claim 12 wherein the device management tree of the electronic device further includes a sub-node for each server in the list of servers, the sub-node defining a role a corresponding server can take to manage or provide content to the software applications associated with the application management object.

14. The electronic device according to claim 7 wherein the application management object is used for registration of each of a list of servers associated with each of the software applications.

15. A method of operating at least one server to remotely manage a plurality of electronic devices, the method comprising:

transmitting to the plurality of electronic devices using a point-to-point transport protocol according to a device management protocol standard, first information that enables the plurality of electronic devices to access transmissions by the at least one server via a broadcast transport protocol, each of the plurality of electronic devices having at least one identifying characteristic;

transmitting to the plurality of electronic devices using the broadcast transport protocol, second information intended only for two or more of the plurality of electronic devices having a common value of the at least one identifying characteristic; and receiving, via the point-to-point transport protocol, result information produced by processing the second information at the two or more of the plurality of electronic devices having a common value of the at least one identifying characteristic; and accessing an application management object in a device management tree of the electronic device, the application management object enabling management features of the electronic device.

16. The method according to claim 15, in which the at least one identifying characteristic comprises one or more of a make, a model, and a version.

17. The method according to claim 15, further comprising setting a data wipe flag in a sub-node of the application management object, the data wipe flag causing the electronic device to wipe any data associated with all application software in the electronic device.

18. The method according to claim 15, further comprising setting a factory reset sub-node of the application management object, the factory reset sub-node causing the electronic device to reset firmware and configuration of the electronic device.

19. The method according to claim 15, further comprising setting a device lock sub-node of the application management object, the factory reset sub-node causing the electronic device to be unavailable until the electronic device is unlocked.

* * * * *